June 26, 1962  J. A. PIETSCH  3,040,501

REMOVABLE FILTER FOR AIR CONDITIONING APPARATUS

Filed Nov. 28, 1958

INVENTOR.
JOSEPH A. PIETSCH
BY
HIS ATTORNEY

United States Patent Office 3,040,501
Patented June 26, 1962

3,040,501
REMOVABLE FILTER FOR AIR CONDITIONING APPARATUS
Joseph A. Pietsch, Jeffersontown, Ky., assignor to General Electric Company, a corporation of New York
Filed Nov. 28, 1958, Ser. No. 777,039
1 Claim. (Cl. 55—500)

The present invention relates to an air filter for use in an air conditioning apparatus and more particularly to a filter which can be easily removed from the apparatus and disassembled for cleaning or replacement purposes.

While the present invention may be used in most types of air conditioning apparatus for heating, dehumidifying, or cooling purposes, it will be particularly described with reference to its application in a self-contained air conditioning unit which is adapted to be mounted within an aperture of an outer wall of a room for cooling the air within the room. In this type of air conditioning unit, it is desirable to filter the air which is circulated through the unit in order to clean the air of entrained dust and lint before it is circulated over the evaporator or cooling coil of the unit so that this dust and lint does not fill up or clog the cooling surfaces of the evaporator and reduce the capacity of the unit.

Air filters commonly used for this purpose generally comprise a quantity of interstitial filter material which is ordinarily held in a four-sided open framework having a skeletonized network across the two open faces of the framework. The filtering medium or material is formed of a mass of plastic, glass, or metallic fibers which eventually becomes loaded with dust and must be cleaned or replaced to restore the filtering effectiveness. In order to properly clean or replace the filter, it is necessary to first remove it from its mounting supports in the air conditioning apparatus and, since the air inlet opening is already provided in the apparatus, this provides a desirable access opening for removing and replacing the filter in the unit. However, if the filter dimensions are greater than that of the air inlet opening and if the filter is held within a stiff four-sided frame, it is sometimes difficult or impossible to remove the filter through this opening. In the alternative, it is necessary to provide a separate inlet and outlet slot for the filter through which it is slipped into place or removed from its position across the air inlet opening.

Further, it is desirable when cleaning the filter, to remove the filter mass from its supporting framework so that it can be easily cleaned. Or, if the filter mass is of the type that can be thrown away and replaced, it is desirable to disassemble the framework and use this part of the filter over and over again rather than discarding it with the used filtering mass. While the cost of the actual filtering mass is relatively low, the cost of the supporting framework brings the cost of the assembled filter to a relatively high figure and the user is reluctant to throw away the entire filter assembly each time the filtering mass becomes clogged. There is, therefore, a tendency on the part of the user to use these "throwaway" type filters longer than they actually should be for best operation of the apparatus. Sometimes, when the filter becomes so clogged that it reduces the air flow through the unit, the user simply removes the filter without replacing it and permits the lint and dirt to clog up the heat exchanger units within the apparatus. This, of course, defeats the purpose of the filter.

Accordingly, it is an object of the present invention to provide an air filter for an air conditioning apparatus which may be easily removed from the apparatus and easily disassembled for cleaning purposes or replacement of the filtering mass.

It is another object of the present invention to provide a removable filter having dimensions at least as great as the air inlet opening of the air conditioning apparatus and which may be easily removed and replaced from its supporting structure through the inlet opening of the apparatus.

It is a further object of the present invention to provide an air filter for an air conditioning apparatus which is adapted to fit into a curved support area.

Further objects and advantages of this invention will become apparent as the following description proceeds and the features of novelty which characterize the invention will be pointed out with particularity in the claim annexed to and forming a part of this specification.

In carrying out the objects of the present invention, there is provided in combination with an air conditioning apparatus having an outer case and an air inlet opening, a removable filter which includes a strip of interstitial filter material and a flat zig-zag folded wire spring, the opposite ends of the filter strip being folded back and secured to inward portions of the strip to form loops in each end of the strip. The wire spring is formed so that the opposite end portions are substantially parallel with each other and extend in the same direction. The spring has a width substantially equal to the width of the filter material and, when in its uncompressed state, it has a length greater than the length of the filter material. The end portions of the wire spring are inserted through the loops in the strip of filter material so that the strip holds the wire spring in compression with the filter material, in turn, being held in tension by the wire spring. Filter supporting means are provided inside the inlet opening of the casing and the opposite ends of the filter are supported therein with the wire spring disposed on the downstream side of the strip of filter material so that the spring supports the strip against the flow of air.

For a better understanding of the invention, reference may be had to the accompanying drawings in which.

Figure 1:
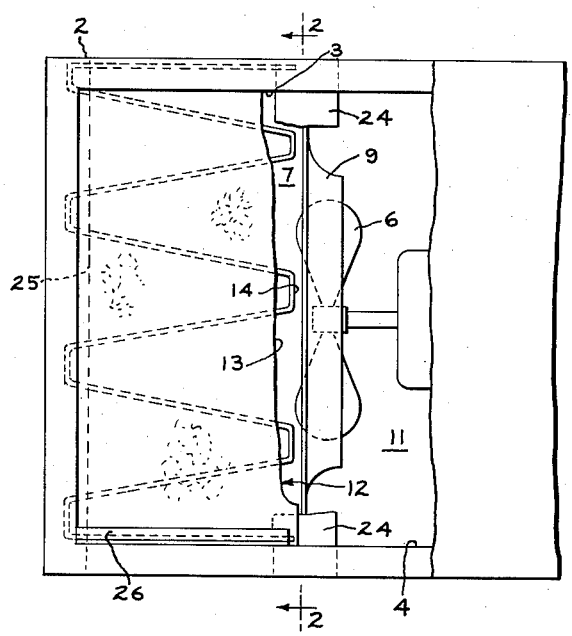
FIG. 1 is an elevation view of part of an air conditioning unit incorporating the filter of the present invention, the view being partially in section to disclose the details of the invention.

Referring now to FIG. 1, there is shown an air conditioning apparatus of the type adapted to be positioned in an aperture in the outer wall of a room. The air conditioning apparatus includes an outer case 2 having a plurality of openings (only two of which are shown) in the sides thereof leading respectively to the room to be conditioned and to the outside. As shown in FIG. 1, the case 2 includes a pair of openings, hereinafter designated the air inlet opening 3 and the air outlet opening 4, through which air from the room to be conditioned is circulated. A fan or air moving means 6, mounted within the unit, draws room air through the inlet opening 3 and discharges the air back to the room through the outlet opening 4. Normally, a refrigerating apparatus is mounted within the case 2, including a pair of heat exchangers one of which is mounted in a heat exchanger section of the case, designated 7, with the heat exchanger being in thermal relationship with the air flowing into the section 7 through the air inlet opening 3. When the air conditioning unit is utilized to cool the air from the room, the heat exchanger 8 (shown in FIG. 2) in the section 7, is operated as an evaporator and cools the air entering the unit from the room through the air inlet opening 3. The fan 6 circulates the air through the heat exchanger 8 and then passes it through the orifice 9 into an outlet section 11 of the case. The air is then discharged through the outlet opening 4 back into the room. The openings 3 and 4 are generally covered by a front grille (not shown) which attaches to the front of the case and provides a decorative appearance for the apparatus as well as preventing large foreign articles from being admitted to the case.

The air being drawn into the unit and being discharged therefrom is normally moving at a rather high velocity and maintains a continual circulation of the air within the room. This causes dust and lint particles from within the room, which are entrained in the air to be drawn into the air conditioning apparatus and means must be provided to remove these particles from the air as it enters the air conditioning apparatus. As will now be explained, the invention deals with an improved air filter for removing these dust and lint particles from the air.

Figure 3:
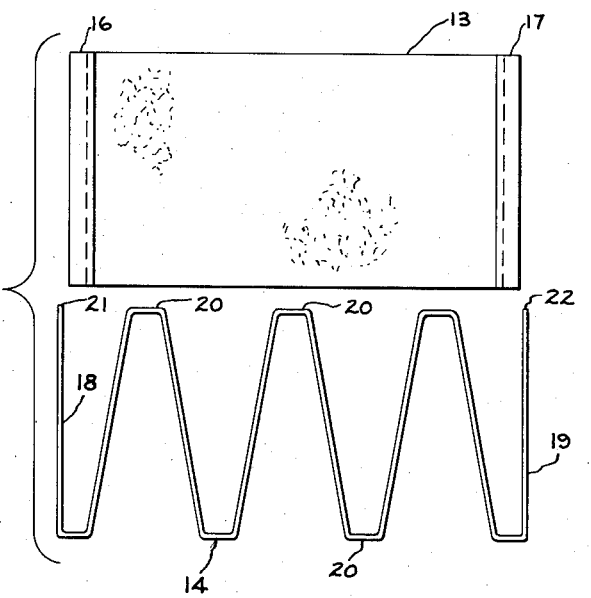
FIG. 3 is an exploded view showing the relative lengths of the filter strip and the spring wire.

Across the inlet opening 3, on the inside of the case, there is provided a filter 12 through which the air from the room must pass prior to entering the heat exchanger section 7. The filter 12 of the present invention is assembled from a rectangular shaped strip 13 of interstitial filter material and a flat zig-zag folded wire spring 14. The strip of filter material 13 may comprise any of the commonly known plastic, glass or metallic fibrous materials now on the market which may be formed into a longitudinal mat capable of withstanding a small amount of tension. Some of these materials tear apart rather easily when placed under a slight amount of tension and the strip may be strengthened by bonding a backing material in the form of a screen or lattice-work of flexible threads, to one side of the fibrous material. The ends of the strip material are folded back and secured to the inward portions of the strip to form loops 16 and 17. As may best be seen in FIG. 3, the wire spring is zig-zag folded to form a flat accordion shaped structure with the end portions 18 and 19 disposed approximately parallel to each other and with the tips 21 and 22 thereof, pointing in the same direction. As may be seen in FIG. 3, the wire spring 14 is of substantially the same width as the interstitial strip of filter material and has an uncompressed length slightly greater than the length of the filter strip. When the strip 13 and the spring 14 are assembled, the spring is slightly compressed and the end portions 18 and 19 are inserted into the loops 16 and 17 of the filter strip. The strip of filter material maintains the wire spring in compression and, conversely, the strip is maintained in tension by the wire spring. Actually very little tension is necessary to maintain the entire structure substantially rigid. In a tested embodiment of the invention, the compression of the spring was less than 1 lb. and a satisfactorily rigid structure resulted.

Whenever it is desirable to clean the filter, it is a simple matter to slide the ends 18 and 19 out of the loops 16 and 17 thereby separating the strip of filter material from its supporting spring. The filter strip 13 may then be washed in any suitable manner. Or, if the filter strip is manufactured out of the type of material which is intended to be thrown away after it becomes filled with lint and dust particles, the strip can be removed from the wire 14 and thrown away and a new strip replaced. In this case, it is only necessary to throw away the relatively inexpensive filter material while retaining the more costly spring wire or frame of the filter unit.

Figure 2:
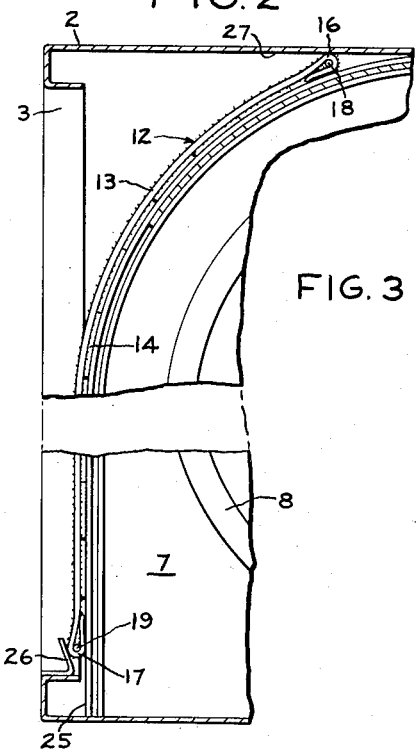
FIG. 2 is a side elevation view in cross section taken along line 2—2 of FIG. 1.

Because of the nature of this filter structure it is possible to remove it from or insert it into an opening having a cross sectional area much smaller than the area of the filter. As seen in FIG. 2, the filter 12 is obviously much greater in length than the height of the opening 3 of the casing 2. However, removal and replacement of the filter 12 within the case 2 through the opening 3 presents no problem, since the spring support 14 of the filter can be easily compressed to an overall length much smaller than the height of the inlet opening 3. The spring and filter strip are merely compressed to a desirable dimension and either brought directly out through the opening or turned 90° so that they can be gently removed from the case. To reinsert the filter into the case, the filter is again compressed to a desired or easily manipulated dimension, placed within the opening and then moved into its approximate position whereupon it is allowed to expand. The ends of the filter are then placed into their proper supported positions.

In FIGS. 1 and 2 the supporting members for the filter are arranged in a curved fashion and the filter of the present invention lends itself very well to such an arrangement. On opposite sides of the opening 3 inwardly thereof, there are provided a pair of curved supporting members 24 and 25 and the reverse bends or zig-zag folds 20 of the wire frame 14 rest on these curved supporting members 24 and 25 with the filter assuming the curve of these members. Since the wire spring 14 has a certain amount of lateral resiliency and the filter strip 13 is resilient, it is easy to accommodate the filter 12 to adapt to the same curvature of the supporting members 24 and 25. However, in order to maintain this curvature it is necessary to restrain the upper and lower ends of the filter. Thus, in FIG. 2, there is shown a lower restraining member 26 which comprises an upwardly extending flange which forces the lower end of the filter against the curved support 25. It will be understood that the opposite side of the lower end of the filter is forced toward the curved support 24, either by a continuation of the flange 26 or by a similar upwardly extending flange. The upper end of the filter or the loop 16 containing the end 18 of the spring wire, is held in place by the top 27 of the casing, in the embodiment of the invention shown in FIG. 2. However, if the curvature of the supporting members 24 and 25 were not great, it might be more convenient to provide the same type of restraining member for the upper end of the filter as for the lower end. That is, it might be expedient to use a downwardly extending flange, similar to flange 26, to retain the upper end of the filter against the supporting members. The filter can be made to assume almost any desirable degree of curvature so long as the spring member 14 is on the inside or on the concave side of the curve.

Figure 4:
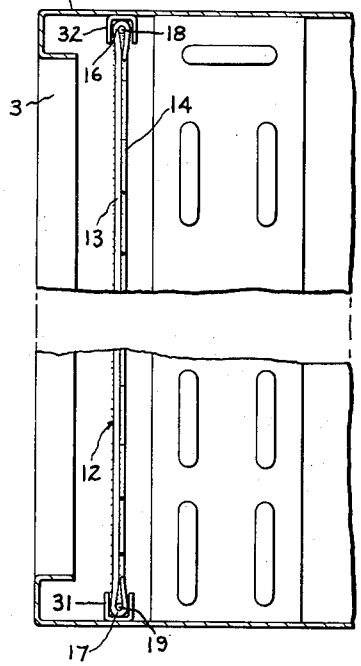
FIG. 4 is a side elevation view showing another mounting arrangement for the filter.

A slightly different arrangement of the filter within the case is shown in FIG. 4. In FIG. 4 the filter is inserted within an opening 3 of the case and is retained in upwardly and downwardly extending U-shaped restraining members 31 and 32. In this arrangement the filter 12 has a height sufficiently great to completely fill the space between the upper and lower portions of the case. Also, in this arrangement, there are no side supports for the reverse bends 20 of the spring wire. The spring itself due to its tendency to assume a straight or planar body provides all the support for the filter.

It should be noted that, in both of the filter supporting arrangements shown in FIGS. 2 and 4, the spring member 14 is on the downstream side of the filter strip in order to lend support to or to back up the strip of filter material against the flow of air. Thus, the air entering the inlet opening 3 first passes through the interstitial filter strip 13 and forces it against the convolutions of the spring wire 14 which prevent further movement of the strip. Obviously, in the arrangement shown in FIG. 4, the spring wire must be sufficiently strong to maintain the ends of the filter tightly adjacent the upper and lower portions of the case 2. That is, the spring must be strong enough to maintain a minimum of curvature in the filter due to the air pressure passing through the central portions of the filter as it passes therethrough. If too great a curvature is permitted, the edges of the filter, which would then pull away from the case 2, might possibly slip around the restraining members 31 and 32 holding the filter in place.

By the present invention there has been provided for an air conditioning apparatus a new and improved filter which is adapted for insertion into and removal from the apparatus through the air inlet opening thereof. Furthermore, the filter can be very simply and easily disassembled for cleaning or replacing the filtering mass.

While in accordance with the patent statutes there has been described what is at present considered to be the preferred embodiment of the invention, it will be obvious to those skilled in the art that various changes and modifications may be made therein without departing from the invention and therefore it is the aim of the appended claim to cover all such changes and modifications as fall within the true spirit and scope of the invention.

What I claim as new and desire to secure by Letters Patent of the United States is:

In an air conditioning apparatus having an outer case with an air inlet opening, the combination comprising a removable filter including a rectangular shaped strip of interstitial filter material and a flat zig-zag folded wire spring, said wire spring having opposite end portions thereof disposed parallel to each other and extending in the same direction, said spring having a width substantially equal to the width of said strip of filter material and having an uncompressed length greater than the length of said strip of filter material, said strip of filter material having opposite ends thereof folded back and secured to inward portions of said strip to form loops in each end thereof, said spring being held in compression by said strip of filter material with said parallel end portions of said spring extending through said loops of said strip, and filter supporting means inside said inlet opening of said casing, said supporting means including curved members disposed on opposite sides of said opening inwardly thereof for supporting said zig-zag folds of said wire spring, and upper and lower end retainers for retaining the ends of said filter against said curved members so that said wire spring conforms to the curved shape of said curved members with said filter material stretched on the convex side of said wire spring.

References Cited in the file of this patent

UNITED STATES PATENTS

| | | |
|---|---|---|
| 1,037,145 | Houser | Aug. 27, 1912 |
| 1,372,128 | Ferguson | Mar. 22, 1921 |
| 1,509,724 | Frame | Sept. 23, 1924 |
| 1,757,690 | Strindberg | May 6, 1930 |
| 1,847,233 | Bilde | Mar. 1, 1932 |
| 1,893,571 | Walloch | Jan. 10, 1933 |
| 2,050,605 | Gordon et al. | Aug. 11, 1936 |
| 2,322,513 | Goodloe | June 22, 1943 |
| 2,516,340 | Pirchio | July 25, 1950 |
| 2,685,345 | Lindner | Aug. 3, 1954 |